United States Patent
Wietzel

(10) Patent No.: US 10,204,738 B2
(45) Date of Patent: Feb. 12, 2019

(54) CAPACITOR ASSEMBLY, HIGH-VOLTAGE DIRECT-CURRENT TRANSMISSION

(71) Applicant: SIEMENS AKTIENGESELLSCHAFT, Munich (DE)

(72) Inventor: Stephan Wietzel, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/755,799

(22) PCT Filed: Aug. 28, 2015

(86) PCT No.: PCT/EP2015/069769
§ 371 (c)(1),
(2) Date: Feb. 27, 2018

(87) PCT Pub. No.: WO2017/036499
PCT Pub. Date: Mar. 9, 2017

(65) Prior Publication Data
US 2018/0330879 A1    Nov. 15, 2018

(51) Int. Cl.
*H01G 2/16*    (2006.01)
*H01G 11/10*   (2013.01)
(Continued)

(52) U.S. Cl.
CPC ............... *H01G 2/16* (2013.01); *H01G 4/38* (2013.01); *H01G 4/40* (2013.01); *H01G 11/10* (2013.01); *H01G 11/16* (2013.01)

(58) Field of Classification Search
CPC ............ H01G 2/16; H01G 4/38; H01G 4/385; H01G 4/40; H01G 11/10; H01G 11/16
(Continued)

(56) References Cited

U.S. PATENT DOCUMENTS 2,447,658 A * 8/1948 Marbury ................. H02H 7/16
                                                    307/109
2,888,613 A * 5/1959 Cuttino ................... H02H 7/16
                                                    323/209

(Continued)

FOREIGN PATENT DOCUMENTS

CN    2935583 Y     8/2007
CN    203858989 U   10/2014
CN    104134970 A   11/2014

*Primary Examiner* — Fritz M Fleming
(74) *Attorney, Agent, or Firm* — Laurence Greenberg; Werner Stemer; Ralph Locher

(57) ABSTRACT

A capacitor assembly has series-connected capacitor element groups, each with a plurality of capacitor elements connected in parallel. The capacitor elements are divided into a first sub-set and a second sub-set. The capacitor elements of the first sub-set have a fuse while those of the second sub-set do not have a fuse. Extended operation is achieved even in the event of individual malfunctioning capacitor elements by using capacitor elements with fuses to separate the corresponding capacitor element in the event of a failure without generating a substantial change in the capacitance of the entire capacitor assembly. In order to prevent an avalanche effect in which the entire capacitor element group is separated, a sub-set of the capacitor elements do not have a fuse, so that a capacitor element is always provided which generates a bridge of the respective capacitor element group in the event of a failure.

13 Claims, 1 Drawing Sheet

(51) Int. Cl.
*H01G 4/38* (2006.01)
*H01G 11/16* (2013.01)
*H01G 4/40* (2006.01)

(58) Field of Classification Search
USPC .............................................. 361/328, 275.4
See application file for complete search history.

(56) References Cited

U.S. PATENT DOCUMENTS

| | | | | |
|---|---|---|---|---|
| 2,933,652 | A * | 4/1960 | Cuttino | H02H 7/16 |
| | | | | 361/17 |
| 3,340,432 | A * | 9/1967 | Desmond | G01R 27/2605 |
| | | | | 361/17 |
| 4,322,772 | A * | 3/1982 | Fry | H02H 7/0833 |
| | | | | 104/288 |
| 4,405,963 | A * | 9/1983 | Holtzman | H02H 7/16 |
| | | | | 361/113 |
| 4,442,473 | A * | 4/1984 | Holtzman | H01G 4/38 |
| | | | | 361/275.4 |
| 5,475,272 | A * | 12/1995 | Gothelf | H01G 2/14 |
| | | | | 307/109 |
| 5,841,334 | A * | 11/1998 | East | H03J 5/246 |
| | | | | 334/55 |
| 6,370,009 | B1 * | 4/2002 | Fellers | H01G 2/14 |
| | | | | 361/277 |
| 2011/0043963 | A1 * | 2/2011 | Bultitude | H01G 2/16 |
| | | | | 361/321.4 |
| 2015/0022938 | A1 * | 1/2015 | Okada | H01G 4/33 |
| | | | | 361/278 |
| 2017/0149345 | A1 * | 5/2017 | Boe | H01G 4/38 |
| 2018/0102529 | A1 * | 4/2018 | Kobayashi | H01M 2/10 |

* cited by examiner

CAPACITOR ASSEMBLY, HIGH-VOLTAGE DIRECT-CURRENT TRANSMISSION

BACKGROUND OF THE INVENTION

Field of the Invention

The invention relates to a capacitor assembly comprising a number of series-connected capacitor-element groups, each of which comprises a plurality of parallel-connected capacitor elements.

Capacitor assemblies of the aforementioned type find application, for instance, in capacitor towers/banks for high and medium voltage, such as are used, for instance, in current filters for the transmission of high-voltage direct current (HVDC). As a rule in this case, a certain number of capacitor assemblies are connected in parallel, and a certain number are connected in series.

The capacitor assemblies in this case consist, as a rule, of a large number of individual capacitor elements which are arranged in a housing which is filled with liquid dielectric and which exhibits terminals that have been routed out in an insulated manner. Such a capacitor assembly is frequently also designated as a capacitor can.

The individual capacitor elements in this case have ordinarily been collected together into capacitor-element groups. The capacitor elements of a group are connected to one another in parallel. Several groups are then connected in series in the capacitor assembly.

In connection with the internal structure of the capacitor assemblies a distinction has hitherto been made between such assemblies having capacitor elements with a fuse and such assemblies having capacitor elements without a fuse. If the individual capacitor elements exhibit no fuses, a fault of only one capacitor element (as a rule, a short circuit) leads to a melting of the capacitor element and therefore to an electrical connection that bridges the entire capacitor-element group. This leads to a large change in the capacitance of the capacitor assembly. This has the result that in the event of just a small number of faulty capacitor elements the rated capacitance of the capacitor assembly has been changed to such an extent that continued operation is no longer possible.

A remedy is provided here through the use of capacitor elements with a fuse. In the event of a short circuit of a capacitor element, the fuse is melted, and the flow of current through the capacitor element is interrupted. The capacitor element is consequently isolated from the capacitor-element group, the remaining capacitor elements of the capacitor-element group continue to be operational, and only a slight change occurs in the capacitance of the entire capacitor assembly.

In a design of such a type, however, the risk of an avalanche effect is disadvantageous: by reason of the slight change in capacitance in the event of capacitor-element faults, these faults are difficult to detect by means of a protective system. If several capacitor elements in a capacitor-element group become faulty in succession and trigger the fuses, both the current load in the remaining fuses and the voltage load in the remaining capacitor elements rise. As from a certain number of faulty capacitor elements in a capacitor-element group, the already mentioned avalanche effect can consequently be triggered. When all the fuses have triggered, the flow of current through the entire capacitor-element group is interrupted, and there is a risk of an electric arc in the capacitor assembly and therefore of the explosion thereof.

SUMMARY OF THE INVENTION

It is therefore an object of the invention to specify a capacitor assembly of the aforementioned type that, on the one hand, permits an operation that is as long as possible even in the event of failure of individual capacitor elements but, on the other hand, minimizes the risk of an explosion of the capacitor assembly.

In accordance with the invention, this object is achieved in that the capacitor elements of at least one of the capacitor-element groups comprise a first subset and a second subset of capacitor elements, and the capacitor elements of the first subset exhibit a fuse, and the capacitor elements of the second subset exhibit no fuse. The capacitor elements of the first subset may also be designated as fused capacitor elements or as fuse-exhibiting capacitor elements. The capacitor elements of the second subset may also be designated as fuseless capacitor elements or as fuse-free capacitor elements.

The invention proceeds from the consideration that continued operation for as long as possible could be achieved, even in the case of individual faulty capacitor elements of a capacitor-element group, through use being made, as far as possible, of capacitor elements with fuses which, in the case of a fault, isolate the capacitor element in question and do not give rise to a considerable change in the capacitance of the entire capacitor assembly. But, in order to avoid an avalanche effect with isolation of the entire capacitor-element group, a subset of the capacitor elements—that is to say, in particular, at least one of the capacitor elements in the capacitor-element group—should also have been realized without a fuse, so that a capacitor element is always present that in the case of a fault gives rise to a bridging of the respective capacitor-element group. By this means, in the event of an avalanche effect, in the course of which all the fuses will open, a bridging of the capacitor-element group is always achieved.

By a capacitor element with a fuse (fused capacitor element, fuse-exhibiting capacitor element) in this context is understood a capacitor element that has advantageously been designed in such a manner that after an overload—that is to say, as a rule after a short circuit—it becomes non-conducting. This can be achieved by, for example, a simple melting fuse being connected in series to the capacitor within the capacitor element.

By a capacitor element without a fuse (fuseless capacitor element, fuse-free capacitor element) in this context is understood a capacitor element that has advantageously been designed in such a manner that after an overload it becomes conducting. This can be achieved by, for example, the capacitor that is arranged inside the capacitor element having been designed in such a way that in the event of a short circuit it melts and forms a conducting connection.

In an advantageous configuration of the capacitor assembly, the at least one of the capacitor groups consists of the first subset and the second subset of capacitor elements—that is to say, there are no further subsets.

In a further advantageous configuration of the capacitor assembly, the capacitor elements of each of the capacitor-element groups each comprise a first subset and a second subset of capacitor elements, and the capacitor elements of the respective first subset exhibit a fuse, and the capacitor elements of the respective second subset exhibit no fuse. In other words: each of the capacitor-element groups exhibits the two different types of capacitor elements, so that in each capacitor-element group and therefore in the entire capacitor assembly an appropriate safeguard against an avalanche effect is guaranteed.

In yet another advantageous configuration of the capacitor assembly, the respective first subset—that is to say, the subset of the capacitor elements with a fuse—is larger than the respective second subset. By this means, the probability is increased that a randomly short-circuiting capacitor element originates from the first subset—that is to say, is provided with a fuse. As a result, the expected time-interval until a capacitor element without a fuse exhibits a fault and bridges the entire capacitor-element group is increased.

Still more advantageously, the capacitor elements of the respective second subset—that is to say, the subset of the capacitor elements without a fuse—have been designed for a higher voltage load and/or current load than the capacitor elements of the first subset. Also by this means, the probability is decreased that, firstly, capacitor elements without a fuse become faulty, and it is ensured that the capacitor-element group remains operational for as long as possible (even though with reduced capacitance).

Advantageously, all the capacitor-element groups in the capacitor assembly are identical. This facilitates the structural design and layout of the capacitor assembly.

A capacitor bank advantageously comprises a number of capacitor assemblies described above.

The rated voltage of the capacitor bank advantageously amounts in this case to more than 1 kV. Especially within medium-voltage and high-voltage ranges, the above-described configuration of the capacitor bank is of particular advantage.

The advantages achieved with the invention consist, in particular, in the fact that, by virtue of the parallel connection of capacitor elements with and without a fuse in the capacitor-element groups of a capacitor assembly, on the one hand a particularly long continued operation of the capacitor assembly is guaranteed even in the case of individual faulty capacitor elements, but on the other hand an avalanche effect with the risk of an electric arc as a result of line interruption of a capacitor-element group is reliably avoided.

By virtue of the stated structural design, the protective system of the capacitor assembly can also be designed more simply: by virtue of the self-protection of the described design, the case of a fault described as an "individual element" (with a fuse) no longer has to be detected by a protective system. The case of a fault described as a "short circuit, element group" fault can be detected comparatively easily by a protective system by reason of the comparatively large change in capacitance following therefrom.

BRIEF DESCRIPTION OF THE SEVERAL VIEWS OF THE DRAWING

The invention will be elucidated in more detail with reference to a drawing. Shown herein are.

Identical parts in both figures are provided with the same reference symbols.

DESCRIPTION OF THE INVENTION

Figure 1:
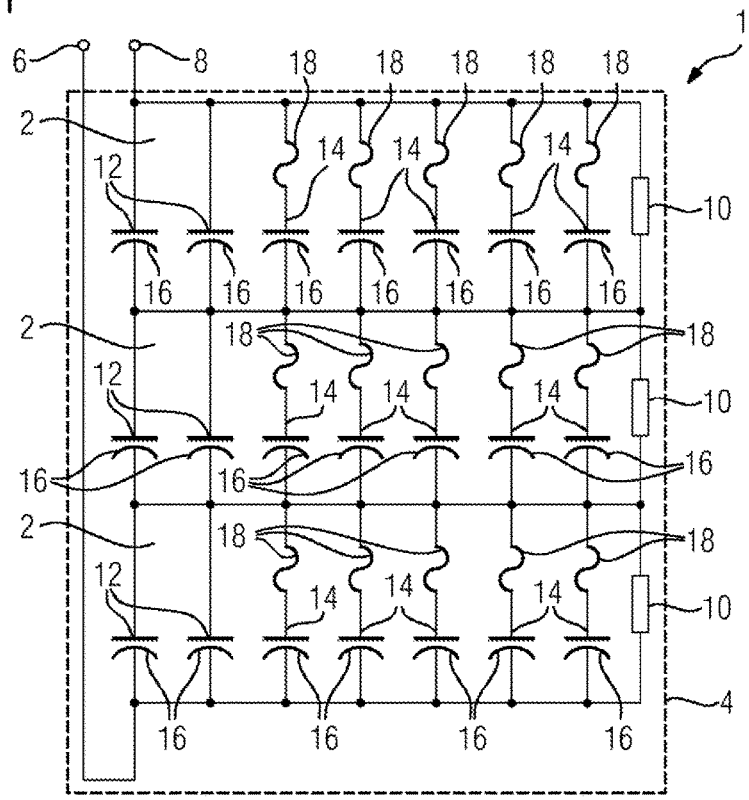
FIG. 1 a circuit diagram of a capacitor assembly with several capacitor-element groups with, in each instance, capacitor elements with and without a fuse, and FIG. 2 a circuit diagram of a capacitor bank with several capacitor assemblies.

FIG. 1 shows a capacitor assembly 1, also designated as a capacitor can, which exhibits a total of three identically designed capacitor-element groups 2. The capacitor-element groups 2 are arranged within a housing 4 which is filled with a dielectric. On its outside, the housing 4 exhibits two electrical connecting terminals 6, 8, between which the capacitor-element groups 2 in the capacitor assembly 1 are connected in series. A discharging resistor 10 is also connected in parallel to each capacitor-element group 2.

Each capacitor-element group 2 in the embodiment consists of seven parallel-connected capacitor elements 12, 14, two of which as capacitor elements without a fuse 12, and five of which as capacitor elements with a fuse 14. Capacitor elements without a fuse 12 consist merely of a capacitor 16; capacitor elements with a fuse 14 consist of a capacitor 16 with series-connected fuse 18. The latter is realized as a melting fuse.

The capacitors 16 of the capacitor elements without a fuse 12 may in one practical form have been designed for a higher loading capacity with respect to current and voltage, and they accordingly short-circuit less quickly than the capacitors 16 of the capacitor elements with a fuse 14. In combination with the greater number of capacitor elements with a fuse 14 in each capacitor-element group 2, this has the result that, in consequence of the ongoing wear and the loading over the operating-time of the capacitor assembly 1, a short circuit occurs first of all in the respective capacitor 16 in the capacitor elements with a fuse 14, and these elements become faulty. By virtue of the short circuit, the respective fuse 18 melts, and the capacitor element 14 is interrupted and isolated from the capacitor-element group 2. This results only in a comparatively slight change in capacitance, though the current load of the remaining capacitor elements 12, 14 in the capacitor-element group 2 rises.

Should further failures occur, possibly in the manner of an avalanche, if too many capacitors 16 of a capacitor-element group 2 short-circuit and the load for the remaining capacitor elements 12, 14 becomes too high, a capacitor element without a fuse 12 will finally also short-circuit. The capacitor 16 melts, and by virtue of the absence of a fuse 18 the capacitor element 12 becomes conducting. It therefore bridges the entire capacitor-element group 2.

The capacitor assembly 1 shown in FIG. 1 consequently has, on the one hand, a particularly long service life, since faults in the capacitor elements with a fuse 14, which in addition by reason of the described structural design are more probable than faults in the capacitor elements without a fuse 12, enable the continued operation of the capacitor assembly 1 with only slight change in capacitance. On the other hand, by virtue of the capacitor elements without a fuse 12, an electric arc and an explosion of the capacitor assembly are reliably avoided. By virtue of this self-safeguarding, a protective system which is not represented in any detail can be realized more simply: said system merely has to register and report the comparatively large change in capacitance by virtue of the described bridging of a capacitor-element group 2; the failure of individual capacitor elements with a fuse 14, which is technically more difficult to ascertain by virtue of the slight change in capacitance, does not have to be registered.

Figure 2:
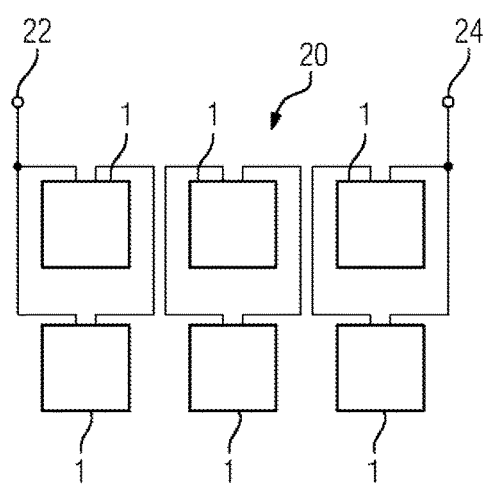

A capacitor bank 20 for medium-voltage and high-voltage applications above 1 kV, such as is used, for example, in converters for transmission of high-voltage direct current, is shown schematically in FIG. 2. Between the electrical terminals 22, 24 of the capacitor bank 20 three capacitor assemblies 1 of the type described in FIG. 1 are connected in series in each of two parallel branches.

The invention claimed is:

1. A capacitor assembly, comprising:
   a plurality of capacitor-element groups connected in series;
   each of said capacitor-element groups including a plurality of capacitor elements connected in parallel;
   said capacitor elements of at least one of said capacitor-element groups including a first subset of capacitor elements and a second subset of capacitor elements; and
   said capacitor elements of said first subset having a fuse and said capacitor elements of said second subset not having a fuse.

2. The capacitor assembly according to claim 1, wherein said capacitor elements of said first subset with the fuse are configured so that the capacitor elements become non-conducting following an overload event.

3. The capacitor assembly according to claim 1, wherein said capacitor elements of said second subset without a fuse are configured so that the capacitor elements become conducting following an overload event.

4. The capacitor assembly according to claim 1, wherein said at least one of said capacitor-element groups consists of said first subset of capacitor elements and said second subset of capacitor elements.

5. The capacitor assembly according to claim 1, wherein said capacitor elements of each of said capacitor-element groups include a first subset of capacitor elements and a second subset of capacitor elements, and wherein said capacitor elements of the respective said first subset include a fuse, while said capacitor elements of the respective said second subset do not have a fuse.

6. The capacitor assembly according to claim 5, wherein said first subset of capacitor elements of a given capacitor-element group is larger than said second subset of capacitor elements of the given capacitor-element group.

7. The capacitor assembly according to claim 5, wherein said capacitor elements of the respective said second subset are configured for a higher voltage load and/or current load than said capacitor elements of the respective said first subset.

8. The capacitor assembly according to claim 5, wherein all of said capacitor-element groups are identical.

9. The capacitor assembly according to claim 1, wherein said first subset of capacitor elements is larger than said second subset of capacitor elements.

10. The capacitor assembly according to claim 1, wherein said capacitor elements of said second subset are configured for a higher voltage load and/or current load than said capacitor elements of said first subset.

11. The capacitor assembly according to claim 1, wherein all of said capacitor-element groups are identical.

12. A capacitor bank, comprising a plurality of capacitor assemblies according to claim 1.

13. The capacitor bank according to claim 12, configured for a rated voltage of more than 1 kV.

* * * * *